N. CAMPBELL.
TRACTION WHEEL.
APPLICATION FILED APR. 18, 1908.
928,848.
Patented July 20, 1909.
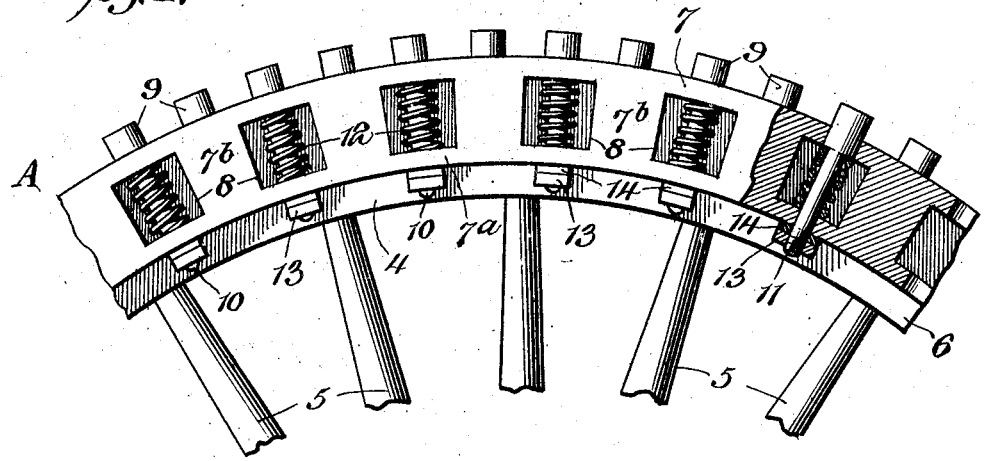
Witnesses
Howard D. Orr
R. J. Foster
Newton Campbell, Inventor,
By E. G. Siggers
Attorney

UNITED STATES PATENT OFFICE.

NEWTON CAMPBELL, OF ELIZABETHTOWN, OHIO, ASSIGNOR OF ONE-FOURTH TO HARRY J. SYKES AND ONE-FOURTH TO JOSEPH W. HAYES, OF ELIZABETHTOWN, OHIO, AND ONE-FOURTH TO GEORGE H. WILSON, OF CLEVES, OHIO.

TRACTION-WHEEL.

No. 928,848.　　　Specification of Letters Patent.　　　Patented July 20, 1909.

Application filed April 18, 1908. Serial No. 427,865.

*To all whom it may concern:*

Be it known that I, NEWTON CAMPBELL, a citizen of the United States, residing near Elizabethtown, in the county of Hamilton and State of Ohio, have invented a new and useful Traction-Wheel, of which the following is a specification.

The present invention relates to wheels for automobile or other road vehicles, and the primary object is to provide a simple and practical structure that is very durable, will prevent slipping and skidding of the wheels, and is intended to take place of the expensive rubber tired wheels now in general use.

The preferred embodiment of the invention is illustrated in the accompanying drawings, wherein:—

Figure 1 is a view partly in elevation and partly in section of a portion of the improved wheel. Fig. 2 is a plan view of the same. Fig. 3 is a cross sectional view. Fig. 4 is a detail perspective view of one of the calks.

Similar reference characters designate corresponding parts in all the figures of the drawings.

In the embodiment illustrated, the wheel as usual, comprises a hub from which radiate spokes 5, said spokes being fixed at their outer ends to or in a rim A. The spokes may be of any structure and of any material, but the rim A is of metal, preferably steel. The rim A is formed with a central ring or web 6 having a pair of concentrically-disposed flanges 7 and 7ª projecting from opposite sides thereof, the outer flanges 7 being flush with the periphery of the web or ring 6 so as to form the tread face of the wheel. The web 4 projects inwardly from the inner flanges 7ª to form an annular rib to which the spokes are connected. Between each pair of flanges 7ª are spaced radially-disposed reinforcing ribs 7ᵇ which are integrally connected with the said flanges and web 6, and between adjacent ribs are formed chambers or sockets 8 which are wholly open at the sides of the rim. The ribs or partitions 7ᵇ on one side of the wheel are staggered with respect to those on the opposite side, so that thereby the chambers 8 on one side will be staggered with relation to those on the other side. The inner and outer walls of each chamber 8 are provided with apertures which extend entirely through the flanges 7 and 7ª for the reception of gripping devices in the form of calks.

Spaced rows of separate calks 9, radially disposed, project from the rim of the wheel, and are preferably elongated or elliptical in cross section. These calks are slidably mounted in the rim, and have shanks 10, which slidably pass through the sockets 8 and project beyond the inner sides of the flanges 7ª, the projecting portions being threaded, as illustrated at 11. The calks are urged outwardly by coiled springs 12 located in the sockets, the inner ends of the springs bearing against the inner walls of said sockets, the outer ends bearing against the heads of the calks. The outward movement of said calks is limited by nuts or other stops 13 mounted on the inner ends of the shanks, and interposed between the nuts and the flanges are buffers 14 comprising washers of rubber or other yielding material. It will be noted that the calks, as well as the sockets are disposed in staggered relation. With this construction, the projecting calks will engage the roadway, particularly if the same is soft, because of sand, mud or the like, and thus the wheels will not slip nor skid. Where a hard roadway is encountered, or if the wheel should pass over a stone or obstruction, the calks will be forced inwardly against the action of the springs, thus preventing jars or shocks. Inasmuch as the tread of the wheel, including the rim and the calks is of hard metal, such as steel, it will be evident that the same will wear for a very great length of time, and should a calk become unduly worn or broken, it can be removed and replaced by a new one with ease and expedition. The cushions or buffers 14 are important, inasmuch as they effectively serve to prevent the noise that would otherwise occur from the nuts striking the flanges.

It will be noted that the heads of the calks as used by me are elliptical and that the heads are so turned that their longer diameters are parallel with the rim of the wheel. This gives a very much better tread surface than if the calk were round headed, and the elliptical head makes a much better engagement with the road surface than would a round head, or an elliptical head having its longer diameter turned transversely to the wheel rim. Calks so constructed and arranged wear better, and, as before remarked, engage more firmly with the ground. In connection with an elliptical calk, the elliptical opening in the wheel rim prevents the calk from turning on its shank. This is important in order to hold the calk with its longer axis substantially parallel to the edge of the wheel rim, and it prevents wear on the passage through the rim.

From the foregoing, it is though that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. A wheel rim comprising a central annular ring or web, a pair of spaced concentrically-arranged flanges projecting from opposite sides of the said web and integrally connected therewith, the outer flanges being flush with the periphery of the web to form a tread face therewith, radially-disposed ribs between each pair of flanges and integrally connected therewith and with the web and forming with the flanges spaced chambers open at the sides of the rim, the inner and outer walls of each chamber having alined apertures for receiving surface-engaging members.

2. A wheel rim comprising a central annular ring or web, a pair of spaced concentrically-arranged flanges projecting from opposite sides of the said web and integrally connected therewith, the outer flanges being flush with the periphery of the web to form a tread face therewith, radially-disposed ribs between each pair of flanges and forming with the flanges spaced chambers open at the sides of the rim, the inner and outer walls of each chamber having alining apertures for receiving surface-engaging members, radially-disposed surface-engaging members extending radially of the rim and each comprising a single-piece element of such length as to extend outwardly and inwardly from the outer and inner flanges, springs arranged in the said chambers for yieldingly holding the members with their outer ends projected from the tread of the wheel, and stops on the inner ends of the members arranged to engage the inner flange to limit the projecting movement of the members.

3. A wheel rim comprising a central annular web, a pair of concentric flanges extending from opposite sides of the web, the outer flange being flush with the periphery of the web and the inner flange being spaced outwardly from the inner edge of the web to form an annular internal rib extending around the rim, spokes connected with the said rib, radial connecting ribs or partitions between each pair of annular flanges, the connecting ribs of one side of the rim being staggered with respect to those on the opposite sides and forming chambers in the sides of the rim, each chamber having apertures in its inner and outer walls, radially-disposed surface-engaging members extending through the chambers and guided in the said apertures, said members being removable outwardly from the rim of the wheel in a radial direction, a spring in each chamber and encircling the member therein for urging the latter outwardly, said spring being removable laterally from its chamber after removal of its surface-engaging member, and devices on the inner ends of the said members engaging the inner flanges of the rim for limiting the outward movement of the members.

In testimony that I claim the foregoing as my own, I have hereto affixed my signature in the presence of two witnesses.

NEWTON CAMPBELL.

Witnesses:
GEO. C. COLUMBIA,
WARREN TEBBS.